Nov. 7, 1967

C. D. BOCK 3,350,916

ACCELEROMETER CALIBRATION ON INERTIAL PLATFORMS

Filed June 1, 1961

INVENTOR.
CHARLES D. BOCK
BY
ATTORNEY.

INVENTOR.
CHARLES D. BOCK
BY
ATTORNEY.

Nov. 7, 1967　　　　　C. D. BOCK　　　　3,350,916
ACCELEROMETER CALIBRATION ON INERTIAL PLATFORMS
Filed June 1, 1961　　　　　　　　　　3 Sheets-Sheet 3

INVENTOR.
CHARLES D. BOCK
BY
ATTORNEY.

United States Patent Office 3,350,916
Patented Nov. 7, 1967

3,350,916
ACCELEROMETER CALIBRATION ON INERTIAL PLATFORMS
Charles D. Bock, Floral Park, N.Y., assignor to American Bosch Arma Corporation, a corporation of New York
Filed June 1, 1961, Ser. No. 114,265
2 Claims. (Cl. 73—1)

The present invention relates to inertial platforms and sensing components thereon and has particular reference to adjusting integrating type accelerometers carried by the platform.

Inertial guidance demands extreme accuracy of its sensing components, such as accelerometers and gyroscopes. Accelerometers which possess the required high performance may not have long term stability so that the calibration and zero setting may drift from day to day, thereby impairing the validity of the indication within a short period of time. Fortunately, inertial guidance of ballistic vehicles is completed within minutes so that if an accelerometer is set and calibrated just prior to launch it can be assumed that its characteristics are constant during its operating periods.

Calibration and setting of the accelerometer in situ presents some problems peculiar to the conditions under which calibration is made. For example, the ballistic vehicle, being a long slender structure, is subject to considerable sway, the effects of which must not interfere with the calibration procedure. Since the size and weight of the guidance equipment must be kept small, the number of components carried by the platform is held to a minimum. To accomplish adjustment of all accelerometers with a minimum of apparatus certain ones are first set to zero and are then used in place of pendulums to provide the required horizontal or vertical reference for the rest of the accelerometers.

In accordance with the invention, the accelerometer zero adjustment is made with the accelerometer in a zero "g" field by regulating the zero adjustment member according to the output of a low pass filter, the input of which is connected to the accelerometer output. After the zero adjustment is accomplished, the calibration is performed by comparing the accelerometer output in a known "g" field with the nominal output in that "g" field. The difference is fed through the low pass filter to remove the sway effects, integrated and fed back to the accelerometer input. When the filter output becomes zero, the calibration of the accelerometer can be determined from the output of the integrator.

For a more complete understanding of the invention reference may be had to the following diagrams in which.

Figure 1:
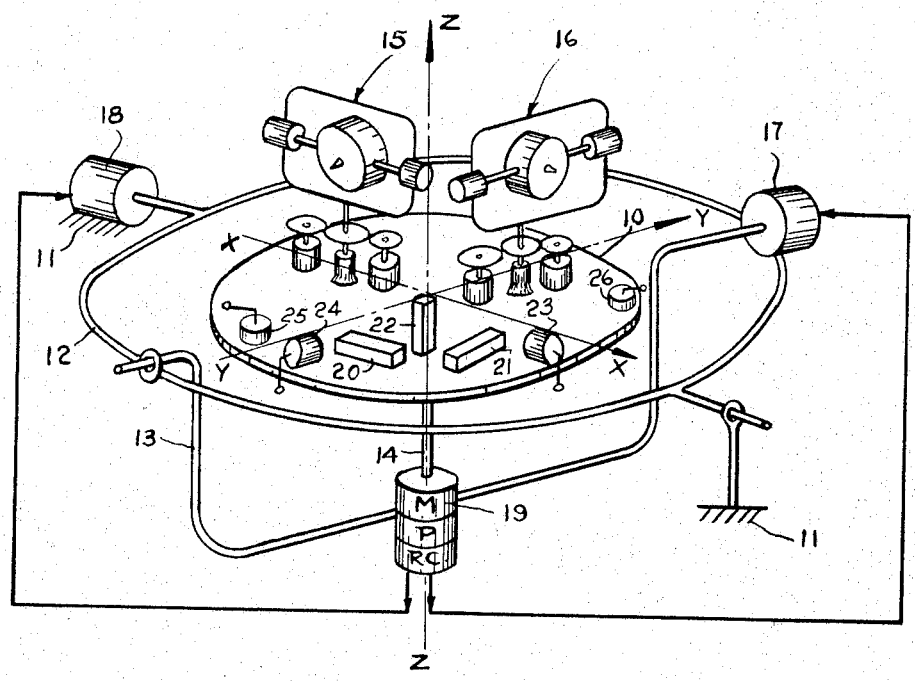
FIGURE 1 shows a typical inertial platform.

FIGURE 1 shows schematically a typical inertial guidance platform such as will find use for the present invention. Briefly, the platform 10 is mounted for universal rotation with respect to the vehicle frame 11 by means of a gimbal system including the pitch gimbal 12 and roll gimbal 13 in which the platform 10 is supported for rotation by shaft 14. The platform 10 is stabilized in inertial space by the gyroscopes 15, 16 mounted thereon, which provide signals to the follow-up motors 17, 18, 19 which drive the platform about the roll, pitch and azimuth axes respectively. The acceleration sensors 20, 21, 22 are also mounted on platform 10, whence their sensitive axes are kept constantly aligned in the direction of their initial orientation in inertial space. These directions correspond to the directions of a right handed set of rectangular axes in which the axis is horizontal and directed toward the destination, the Y axis is horizontal and perpendicular to the X axis and the Z axis is vertical directed upwards.

An accelerometer, as used in this application, will be understood to include the acceleration sensors 20, 21, 22 which are mounted in the platform 10 and all the associated electronic and mechanical apparatus required to interpret the sensor response and to produce a sensible output. In this instance the accelerometers are integrating accelerometers which provide a mechanical output such that the speed of the output shaft is proportional to acceleration and the displacement of the shaft is proportional to velocity. It should be further understood that integrating accelerometers having electrical outputs can be treated in a manner similar to that to be described, by using electrical equivalents for the mechanical devices in the description. The three accelerometers in this application will be identified by priming of the sensor numerals 20, 21, 22 since as explained above the sensors are merely one part of the accelerometer proper. Thus accelerometer 20' includes the accelerometer sensor 20 plus other associated equipment not shown in FIGURE 1, but shown in some of the other figures.

The platform carries pendulums 23 and 24 which respond to limited tilts about the X and Y axes of the platform 10 from the horizontal when these axes are in their prescribed initial orientation, i.e. horizontal. The platform also carries pendulums 25 and 26 which are responsive to limited tilts of the platform 10 about the Z axis when the Z axis is horizontal. The two Z pendulums are required to measure the tilt when the X axis, for example, is directed vertically upwards or when the X axis is directed vertically downwards, since one pendulum cannot sense both errors.

Prior to installation of the platform in the vehicle, the platform components have been calibrated and the zero setting has been adjusted in the shop. Calibration as used here means the determination of a modifier for the actual output in response to a known input to obtain a corresponding modified output and does not imply an internal adjustment to obtain an actual output corresponding to the input. In the shop procedure the platform 10 is accurately oriented with respect to a precise horizontal reference plane by optical means in six different positions which represent specific horizontal and vertical alignments of the X, Y and Z axes. These positions may be identified by reference to the particular axis which is vertical and the direction in which it points. For example, in the Z-plus position, which is also the initial position of the inertial platform, the Z axis is vertical pointing upwards and the Z-minus position the Z axis is pointing downwards, while the X and Y axes are horizontal. In the X-plus and X-minus positions the X axis is vertical pointing upwards and downwards respectively while the Z and Y axes are horizontal, and similarly in Y-plus and Y-minus position, the Y-axis is vertical, while the Z axis and the X axis are horizontal. When the platform is placed in each different orientation, the readings of accelerometers 20', 21', 22', are recorded. With the aid of these readings each of the accelerometers zero setting and output gradient are determined. If the zero setting is not correct, it is adjusted to zero and the output gradient or characteristic is recorded.

With the platform in the Z-plus orientation, the outputs of pendulums 23, 24 are observed and recorded, and in the absence of any errors these readings should be zero. However, mounting of pendulums 23 to 25 on platform 10 and other errors will probably result in some outputs of the pendulums, which when repeated in the field will assure that the platform is again in the Z-plus position. Similarly the readings of pendulums 25 and 26 are recorded in the X plus and the X minus orientations respectively.

If the platform attitude is adjusted in the field so that the pendulums 23 and 24 read the same as they did when the platform was in the Z plus position in the shop, but the accelerometers 20', 21' do not indicate a zero acceleration, it can be assumed that the zero settings of the accelerometers have drifted and they must be therefore readjusted to zero. After the accelerometer zero is adjusted, the accelerometer is oriented in the vertical and the calibration adjustment, which involves bringing the output gradient of the accelerometer to the predetermined shop calibrated gradient, is accomplished.

Figure 2:
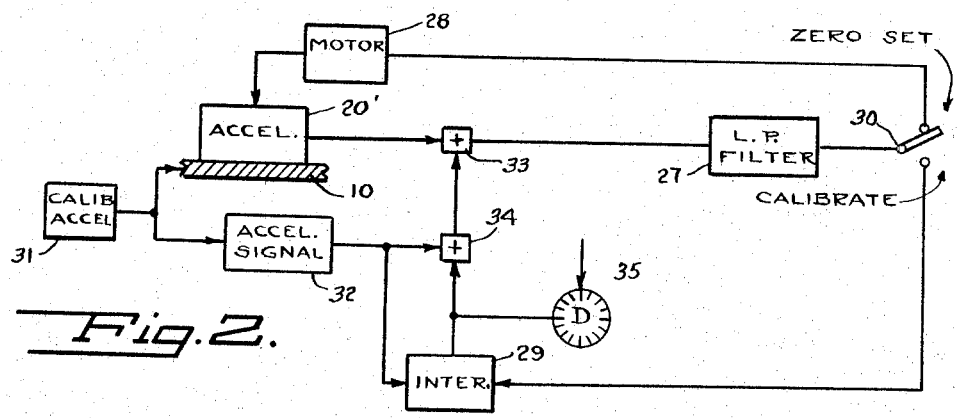
FIGURE 2 is a schematic diagram of the general compensation scheme.
Figure 3:
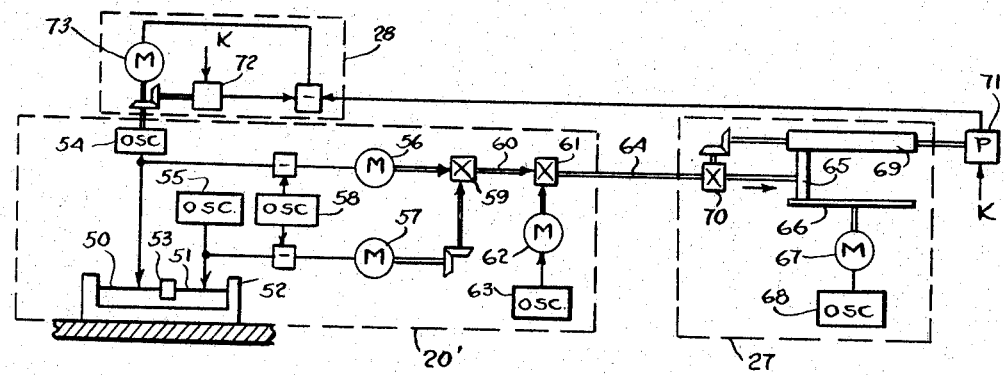
FIGURE 3 shows a particular circuit for the zeroing adjustment.
Figure 4:
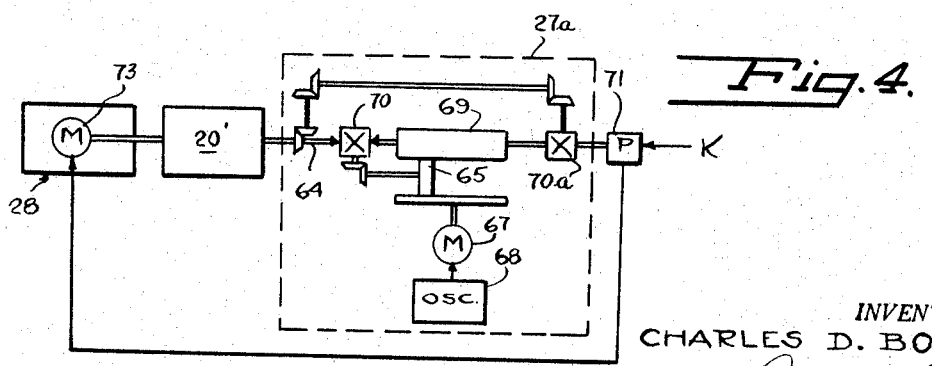
FIGURE 4 shows a particular circuit for the calibration purposes.

Adjustment is done as shown in FIGURE 2 where the functional circuit for adjusting both the zero setting and output gradient of one accelerometer e.g. 20', is illustrated in a general way, and as shown in FIGURES 3 and 4 for a specific accelerometer which uses vibrating members as acceleration sensors.

The accelerometer 20' is shown as attached to platform 10. The output of the accelerometer 20' is applied to a low pass filter 27 and the output of the filter is transmitted to either a motor 28 or integrator 29 by means of selector switch 30. A known acceleration is applied to the platform 10 by the device 31 which also regulates a device 32 for producing an output signal equal to the nominal output of the accelerometer 20' for the applied acceleration. The simplest configuration for device 31 is a means for providing precise horizontal alignment of the acceleration sensor 20 for zero acceleration and vertical alignment of the acceleration sensor 20 for an acceleration of about 32.1 ft./sec./sec. The true value of the acceleration of gravity is precisely known for the location at which adjustment is made, however.

For setting the accelerometer zero then, the platform or accelerometer support 10 is aligned horizontally (according to pendulums 23 and 24) so that the accelerometer output should be zero. However, if the zero adjustment is not correct, the motor 28 is energized by the output of filter 27 through switch 30 to adjust the accelerometer until the filter output is zero. The filter 27 is interposed between accelerometer 20 and motor 28 to reduce or remove the effects of periodic spurious motion of the platform 10 which may be caused by sway, for example.

After the zero is set, the accelerometer scaling is calibrated in the following manner: the filter 27 output is switched to the integrator 29, and the accelerometer 20' is subjected to a known acceleration, i.e. one "g," by the device 31. For this "g" value the acceleration sensor 20 is oriented to a vertical position by device 31. The output of device 32, equal to the nominal output of the accelerometer 20' under an acceleration of one "g" is subtracted from the accelerometer 20' output at 33 and the difference is applied to the inegrator 29 through low pass filter 27. The difference signal will cause the integrator 29 to modify the signal output of device 32 at differential 34 until the modified nominal signal agrees with the actual signal of accelerometer 20'. The compensating signal from integrator 29, which may be indicated on dial 35, is a measure of the accelerometer calibration factor at the known acceleration and is employed in calculations to correct the nominal calibration of the accelerometer during operation of the guidance system.

The generalities of FIGURE 2 are particularly directed to a preferred embodiment of the integrating accelerometer in the FIGURES 3 and 4. The integrating accelerometer of preferred construction is of the vibrating string type fully described in copending patent application Ser. No. 586,615, filed May 22, 1956, now patent No. 3,332,-290, wherein the frequencies of a pair of strings vibrating at their natural frequencies are oppositely affected by an acceleration along the strings. The difference frequency is a measure of acceleration and a count of the cycles of frequency difference represents an integration of acceleration or velocity.

In FIGURE 3, the accelerometer 20' includes a sensor 20 in which a pair of axially aligned wires 50, 51 are attached to frame 52 and have a weight 53 interposed between the wires. Oscillators 54, 55 maintain wires 50, 51 respectively oscillating at their natural frequencies $f_1$ and $f_2$. Synchronous motors 56, 57 are energized by signals of frequencies $f_1-f_c$ and $f_2-f_c$ obtained by heterodyning the $f_1$ and $f_2$ frequencies with a constant $f_c$ frequency from oscillator 58. Synchronous motors 56, 57 drive the input shafts of a mechanical differential 59, the rate of rotation of the output shaft 60 of which represents the difference of $f_1-f_2$ or the acceleration of platform 10 in the direction of the strings 50, 51. Ordinarily, the frequencies $f_1$ and $f_2$ are equal at zero acceleration creating a "lock-in" condition where small accelerations are not able to cause frequency changes, thereby resulting in error. To reduce the error effect of "lock-in," the "lock-in" point is moved away from the zero acceleration by introducing a bias to the output of the accelerometer and electronically adjusting the resonant frequency of one oscillator, $f_1$, accordingly. The direction of the offset is such that the accelerometer output increases during launch so that another "lock-in" position is not created. This bias is corrected in mechanical differential 61 by a synchronous motor 62 energized by an oscillator 63 at the bias frequency, so that the output of the differential 61 at shaft 64 is equal to the sum of the outputs of differential 59 and motor 62.

Now, in order to set the accelerometer to zero accurately and automatically, the platform 10 is horizontally aligned so that the strings 50, 51 are normal to the gravity vector. The output of differential 61 is applied to the mechanical filter 27 which includes a lag device using a disc-and-roller type integrator. In this filter, shaft 64 of differential 61 positions roller 65 radially on disc 66 which is driven at a constant speed by synchronous motor 67 which is energized from a constant frequency power source 68 such as an oscillator, for example. The drum 69 is driven by roller 65 and the rotation thereof is fed back to the input and to roller 65, through differential 70. Thus, the rotation of drum 69 corresponds to the rotation of the output of differential 61, except that the lag introduced by the feedback to differential 70 filters out the high frequency oscillations of the output of differential 61. The frequencies selected to be cut out by the lag device are eliminated from the output by choosing the ratio of the gearing (not shown) in the feedback loop. These are selected so as to eliminate the spurious accelerations mainly due to platform motion under missile sway, although other "noises" are also filtered out. The position of the drum 69 is repeated at the oscillator 54 by a servo loop including potentiometers 71, 72 and motor 73. The motor 73 adjusts the phase shift of oscillator 54 so as to change $f_1$ and make the output of differential 61 approach zero. When the output reaches zero so that shaft 64 is non-rotating and the roller 65 is at the center of disc 66, the accelerometer zero is properly adjusted. If the roller is not in the center of the disc, it will continue to be driven toward the center by drum 69 and the accelerometer will be readjusted to zero.

If the accelerometer zero is to be adjusted by a motor 73 (FIG. 4) which is energized directly by the potentiometer 71 instead of using a servo system, the filter 27 must also introduce a lead component at its output in order to compensate for the integration which is inherent in the operation of the adjusting motor. This lead component will be included automatically when the output of the mechanical filter 27 is obtained from the sum of the input and output of differential 70 in FIG. 3 as by differential 70a in FIG. 4 instead of from the rotation of the drum 69 alone.

Although the description here has emphasized the use of mechanical components, an electrical equivalent can be used as well. However, since long time constants are required and the electrical equivalents operate on D.C. signals, it may be more convenient to use the mechanical circuits shown.

Figure 5:
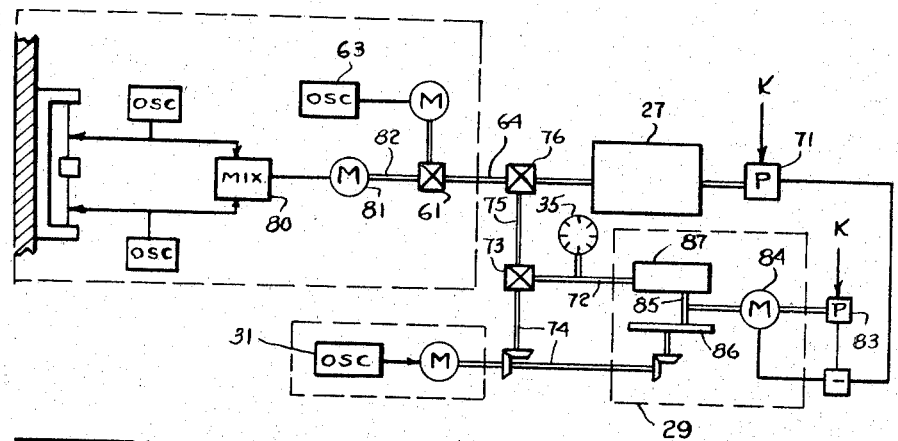
FIGURE 5 shows another calibration circuit.

The accelerometer having been adjusted to zero as described above, is accurately and automatically calibrated by using the circuit generally depicted in the lower half of FIGURE 2, and more specifically shown with respect to the vibrating string accelerometer in FIGURE 5. Referring now to FIGURE 5, the frequency difference $f_1-f_2$ of strings 51 and 52 is converted to a shaft rotation in a slightly different manner than in FIGURE 3, merely for variety. The frequency difference obtained in a mixing device 80 is applied to a synchronous motor 81 which drives shaft 82 accordingly at a synchronous speed $f_1-f_2$ which is therefore proportional to the acceleration sensed by the accelerometer strings 50, 51.

The acceleration sensor 20 on platform 10 is aligned vertically with the aid of a pendulum for example, as will be described later. The gravity acceleration is precisely known for the particular location and the nominal acceleration signal from device 31 is adjusted to this known "g" value (e.g. 32.1 ft./sec./sec.) in terms of nominal speed of shaft 64 (for example 64.2 revs./min. for 32.1 ft./sec./sec.)

The nominal calibration signal from device 31 is modified by the calibrating circuit which includes a mechanical differential 73 having inputs at shaft 72 and shaft 74 and an output shaft 75. The speed of output shaft 75 and the speed of the biased output from differential 61 are compared in differential 76, and the difference is applied through the low pass smoothing filter 27 to the input of the integrating device 29 by means of the electrical loop between potentiometers 71, 83. Thus the motor 84, controlled by the difference between the outputs of potentiometers 71, 83, displaces the roler 85 of integrator 29 radially on the disc 86 to the position where the rotation of drum 87 added to the nominal acceleration from device 31 is just sufficient to counter the rotation of the accelerometer output shaft 64. At this point the filter 27 input and output are zero, and the rotation of drum 87 represents the required correction in the calibration factor of the accelerometer at the known "g" value. The calibration correction may be read on the dial of a speed indicator 35 driven by the drum 87. Under actual operating conditions, the output of the accelerometer is continuously corrected in accordance with the calibration constant determined by the automatic test just described. This correction is most conveniently applied in the computer which accepts the accelerometer outputs.

It will be obvious to those in the art that each of the mechanical devices of FIGURE 5 can be replaced by electrical equivalents if desired but the advantages of the mechanization approach have been set forth earlier. For this equivalent it should be noted that the filter 27 is classified as a low pass filter.

It has been shown in FIGURES 3 and 5 how one particular accelerometer can be set and calibrated after the sensitive axis of the accelerometer is first oriented horizontally in a zero "g" field, and then oriented vertically in a "g" field of about 32 ft./sec.² For an isolated accelerometer this is easily accomplished by appropriate pendulums for detecting the horizontal and vertical attitudes of the support to which the accelerometer is attached.

However, pendulums can detect tilt about an axis from a specified zero position only, i.e. pendulum 23 is effective only for a small angle of tilt about the X-axis when the Z axis is substantially vertical upwards. If the Z axis is pointed downward pendulum 23 is upside down and is inoperative. If the Y axis is vertical the pendulum 23 is against one of its stops and again is inoperative. This could be remedied by having four pendulums on the X axis responsive to tilts about the X axis one of which would be operative in each position. Similarly, four pendulums would be required on each of the Y and Z axis to be able to cover all possible positions of the platform 10. Such a remedy obviously would be undesirable because of the large number of components which would be operative for a specific limited purpose only, and which have no use at all after the platform is in flight.

In order to reduce the components to a minimum, only the four pendulums 23–26 are used and the functions of the missing pendulums are assumed by the accelerometers after they have been adjusted to zero. Since the accelerometers are null seeking devices when used in this fashion their calibration is not important but their zero setting is important and must be checked prior to use for leveling purposes.

The sequence of operations therefore would be somewhat like the following to obtain all of the desired orientations and thereby be able to perform the required zero setting and calibration of all the accelerometers. Other sequences are possible, of course, and no significance should be attached to this example.

(1) The Z-plus orientation is set up with pendulums 23, 24 and the zeros of accelerometers 20', 21' are set.

(2) The X-plus orientation is set up with pendulum 25 and accelerometer 21'. In this position accelerometer 20' is calibrated to "+g," and the zero of eccelerometer 22' is adjusted.

(3) The X-minus orientation is set up with pendulum 26 and accelerometer 21'. In this postion the accelerometer 20' is calibrated to "−g."

(4) The Y-plus position is set up with accelerometers 20', 22' and accelerometer 21' is calibrated to "+g."

(5) The Y-minus position is set up with accelerometers 20', 22' and accelerometer 21' is calibrated to "−g."

(6) The Z-minus position is set up with accelerometer 20', 21' and accelerometer 22' is calibrated to "−g."

(7) The Z-plus position is set up again as in Step 1 and the accelerometer 22' is adjusted to "+g."

It will be seen that all the accelerometers have had their zero's set up and have been calibrated at both +g and −g values. It will be seen further that the accelerometers have been used to level the platform about certain axes only after the zero setting was accomplished.

Figure 6:
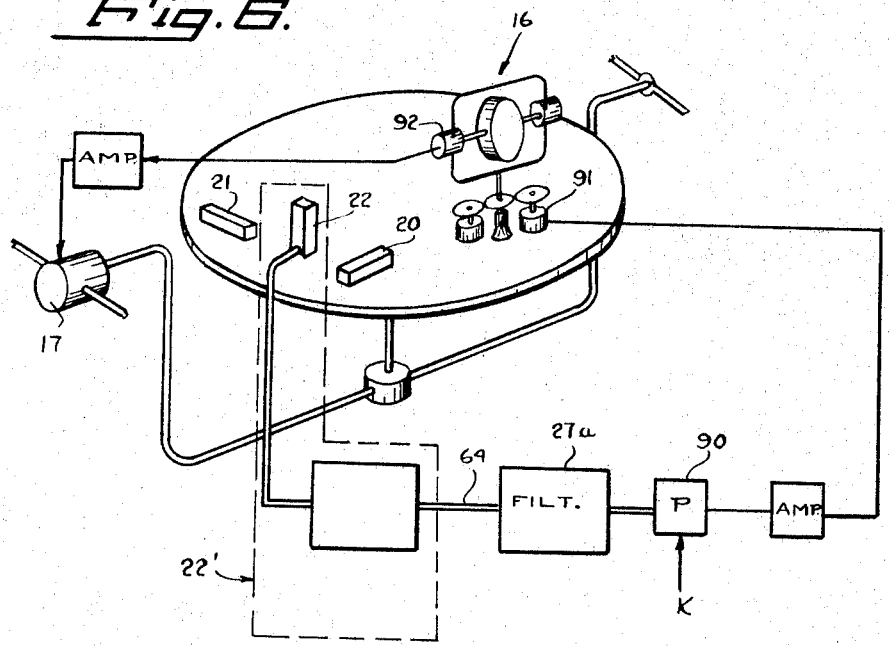
FIGURE 6 shows preferred means for leveling the platform.

The platform leveling circuit is shown in FIG. 6.

Assume that acceleration sensor 21 is to be set vertical for calibration purposes and that acceleration sensor 22 is to be used to orient the platform 10 until acceleration sensor 22 is level and acceleration sensor 21 is vertical.

The output of accelerometer 22' as in the previous figures is available as a rotation of shaft 64, the speed of which corresponds to the measured acceleration. The rotation of shaft 64 is applied to a lead-lag mechanical filter 27a the output of which drives the input arm of an electromechanical potentiometer 90. The potentiometer output, or loop error signal, is amplified and applied to a torque motor 91 on the platform stabilizing gyro 16, causing precession of the gyro 16. The gyro pickoff 92 energizes the servo motor 17 which drives the platform 10 in a direction to reduce the accelerometer 22' output to zero. When accelerometer 22' shows zero, sensor 22 is horizontal and sensor 20 is in a vertical plane. The lag part of the filter 27a is used to minimize the effects of extraneous noise in the accelerometer output such as might be caused by swaying of the missile or other external disturbances while the lead part of the filter is necessary for loop stability because of two integrations around the loop without lead compensation.

FIGURE 6 shows the leveling means active about one axis only. Leveling about another axis would be accomplished by the other gyro 15 on the platform 10 and one of the other accelerometers in the same fashion. FIGURE 6 assumes alignment of pickoff 91 and servo motor 17 whence the resolver on the shaft 14 (FIG. 1) is not in the circuit although in practice the resolver would be used in the well known manner for coordinate transformation.

I claim:
1. In a method for zero-setting and calibrating first, second, and third linear accelerometers mounted on a platform and oriented respectively in fixed alignment with three mutually-orthogonal directional axes X, Y and Z on said platform, the steps of:

mounting four pendulums on said platform, a first one of said pendulums being responsive to tilts of said platform about said X axis, a second one of said pendulums being responsive to tilts of said platform about said Y axis, a third one of said pendulums being responsive to tilts of said platform about said Z axis when said X axis is vertical and directed upward, and a fourth one of said pendulums being responsive to tilts of said platform about said Z axis when said X axis is vertical and directed downward;

leveling the X–Y plane of said platform, with said Z axis directed upward, according to the outputs of said first and second pendulums to establish a first position for said platform, and then setting the zero readings of said first and said second accelerometers while said platform is in said first position;

leveling the Z–Y plane of the platform, with said X axis directed upward, according to the outputs of said second accelerometer and said third pendulum to establish a second position for said platform, and then setting the zero reading of said third accelerometer and detecting the output of said first accelerometer while said platform is in said second position;

leveling the Z–Y plane of said platform, with said X axis directed downward, according to the outputs of said fourth pendulum and said second accelerometer to establish a third position for said platform, and detecting the output of said first accelerometer while said platform is in said third position;

leveling the X–Z plane of said platform, with said Y axis directed upward, according to the outputs of said first and said third accelerometers to establish a fourth position for said platform, and detecting the output of said second accelerometer while said platform is in said fourth position;

leveling the X–Z plane of said platform, with said Y axis directed downward, according to the outputs of said first and third accelerometers to establish a fifth position for said platform, and detecting the output of said second accelerometer while said platform is in said fifth position;

leveling the X–Y plane of said platform, with said Z axis directed downward, according to the outputs of said first and second accelerometers to establish a sixth position for said platform, and detecting the output of said third accelerometer while said platform is in said sixth position; and returning said platform to said first position and then detecting the output of said third accelerometer while said platform is in said first position.

2. In a device of the character described for calibrating an accelerometer:

means for applying a known acceleration to said accelerometer;

signal generating means for generating an output signal proportional to said known acceleration and representative of the nominal output of said accelerometer;

signal modifying means having two input terminals and an output terminal, one of said input terminals being supplied with said output signal of said signal generating means and responsive thereto to produce a signal at said output terminal, said signal modifying means also being responsive to an input signal applied to the other of its input terminals to modify said signal at said output terminal;

means for comparing the output of said accelerometer with said signal at said output terminal of said signal modifying means to produce a signal representative of the difference between said output of said accelerometer and said signal at said output terminal;

a low-pass filter supplied with said difference-representing signal;

signal integrating means having a first input terminal supplied with said output signal of said signal generating means, a second input terminal supplied with the output of said filter, and an output terminal connected to said other input terminal of said signal modifying means so as to vary said signal at said output terminal in the direction to reduce said difference-representing signal towards zero; and indicator means responsive to the signal developed at said output terminal of said integrating means for producing indications of the error in said accelerometer output for said known acceleration.

References Cited

UNITED STATES PATENTS

| | | | |
|---|---|---|---|
| 2,705,421 | 4/1955 | Arnold | 73—1 |
| 2,761,306 | 9/1956 | McNutt | 73—1 |
| 2,788,654 | 4/1957 | Wiancko et al. | 73—1 |
| 2,953,858 | 9/1960 | Wrigley et al. | 244—14.4 |
| 2,958,522 | 11/1960 | Slater | 73—504 |

FOREIGN PATENTS

| | | | |
|---|---|---|---|
| 792,346 | 3/1958 | Great Britain | 73—504 |

OTHER REFERENCES

Article titled "Inertial Navigation: Out of the Laboratory" published in "Aviation Week," Jan. 2, 1956, pages 32 to 35.

"Accelerometer Calibration"—Part 2; Measurement of Accelerometer Output by Lawrence Moskowitz, published in vol. 34, Instruments and Control Systems, March, 1961, pages 467 to 470.

BENJAMIN A. BORCHELT, *Primary Examiner.*

SAMUEL FEINBERG, ARTHUR M. HORTON,
*Examiners.*

L. L. HALLACHER, W. C. ROCH, R. F. STAHL,
*Assistant Examiners.*